UNITED STATES PATENT OFFICE.

THOMAS D. BALL, OF LAMAR, MISSOURI.

PROCESS FOR TREATING BRICKS, STONE, AND ARTIFICIAL STONE.

No. 835,742.　　　Specification of Letters Patent.　　　Patented Nov. 13, 1906.

Application filed December 27, 1905. Serial No. 293,466

*To all whom it may concern:*

Be it known that I, THOMAS D. BALL, a citizen of the United States, residing at Lamar, in the county of Barton and State of Missouri, have invented certain new and useful Improvements in Processes for Treating Bricks, Stone, and Artificial Stone; and I do hereby declare the following to be a full, clear, and exact description of the invention, such as will enable others skilled in the art to which it appertains to make and use the same.

My invention relates to a process of treating artificial-stone blocks, bricks, and articles of like nature; and my object is to apply certain ingredients to said stone or manufactured articles whereby the same will be hardened and made waterproof, thus prolonging the wearing qualities and life of the same.

Other objects and advantages will be hereinafter made clearly apparent in the accompanying specification, and pointed out in the claim.

With the above and other objects in view my invention consists in incorporating with the cement mixture while in a plastic state or during the molding process an oleaginous body and carbonate oxid or white lead and causing it to penetrate the pores and harden and waterproof the product.

In constructing walls of buildings it is a well-known expedient to use slate or other material to prevent moisture from rising in said walls, and to this end I apply a coating of oil to the wall after the same has been built a suitable distance above the ground, or I use the oil-treated material for a few courses from the foundation up or in the top course of the foundation, thus waterproofing the same at this point to prevent moisture from rising above the point where the oil is applied.

By treating the above-mentioned articles in the manner described I am enabled to manufacture said articles in a much more porous condition than would be possible if they were not so treated, from the fact that said oils penetrate the pores of said articles and make them waterproof, at the same time hardening them, so that the wearing qualities will be greater than articles made in the usual way.

What I claim is—

The herein-described method of treating cement blocks and the like, which consists in incorporating therewith while in a plastic state an oleaginous body and carbonate oxid or white lead, and causing it to penetrate the pores and harden and waterproof the product.

In testimony whereof I have signed my name to this specification in the presence of two subscribing witnesses.

THOMAS D. BALL.

Witnesses:
　LAWRENCE MAURER,
　W. D. GRIFFIN.